United States Patent
Mladenovic et al.

(10) Patent No.: US 7,027,905 B1
(45) Date of Patent: Apr. 11, 2006

(54) MASS AIR FLOW ESTIMATION BASED ON MANIFOLD ABSOLUTE PRESSURE

(75) Inventors: Ljubisa M. Mladenovic, Ann Arbor, MI (US); Kenneth J. Buslepp, Brighton, MI (US); Douglas E. Trombley, Hartland, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/953,956

(22) Filed: Sep. 29, 2004

(51) Int. Cl.
*F02D 45/00* (2006.01)

(52) U.S. Cl. .................................... 701/102; 73/118.2
(58) Field of Classification Search ..................... None
See application file for complete search history.

(56) References Cited

U.S. PATENT DOCUMENTS

| | | |
|---|---|---|
| 4,750,352 A | 6/1988 | Kolhoff |
| 4,920,790 A | 5/1990 | Stiles et al. |
| 4,957,088 A * | 9/1990 | Hosaka ........................ 123/480 |
| 4,958,516 A | 9/1990 | Stiles et al. |
| 4,987,773 A | 1/1991 | Stiles et al. |
| 4,999,781 A | 3/1991 | Holl et al. |
| 5,094,213 A | 3/1992 | Dudek et al. |
| 5,150,692 A | 9/1992 | Trombley et al. |
| 5,270,935 A | 12/1993 | Dudek et al. |
| 5,273,019 A | 12/1993 | Matthews et al. |
| 5,351,660 A | 10/1994 | Logozzo |
| 6,352,065 B1 * | 3/2002 | Wild et al. .................. 73/118.2 |
| 6,851,304 B1 * | 2/2005 | Cullen et al. ............... 73/118.2 |
| 6,920,863 B1 * | 7/2005 | Aono et al. ................. 73/118.2 |
| 2004/0260482 A1 * | 12/2004 | Tanaka et al. ............. 73/118.2 |

* cited by examiner

*Primary Examiner*—Andrew M. Dolinar
(74) *Attorney, Agent, or Firm*—Christopher DeVries

(57) ABSTRACT

A control system that determines a mass air flow through a throttle of an internal combustion engine (ICE) having an intake manifold includes a calculator that calculates an estimated mass air flow based on a throttle position and an adjustment module that determines an adjustment value. The adjustment value is based on the estimated mass air flow, an estimated manifold absolute pressure and a measured manifold absolute pressure. A multiplier multiplies the estimated mass air flow by the adjustment value to determine the mass air flow.

25 Claims, 2 Drawing Sheets

MASS AIR FLOW ESTIMATION BASED ON MANIFOLD ABSOLUTE PRESSURE

FIELD OF THE INVENTION

The present invention relates to estimating mass air flow through a throttle of a vehicle, and more particularly to estimating mass air flow based on manifold absolute pressure.

BACKGROUND OF THE INVENTION

Internal combustion engines (ICE's) are controlled based on a manifold absolute pressure (MAP) and mass air flow (MAF) signals that are generated by MAP and MAF sensors, respectively. A controller controls emissions and engine performance characteristics of the ICE based on the MAP and MAF signals. For example, critical engine parameters, such as air-to-fuel (A/F) ratio, can be adjusted by knowing the mass of air available for combustion.

MAF sensors are commercially available and have been used with ICE's to provide the required MAF information. MAF sensors, however, are relatively expensive as compared to other sensors implemented with the ICE. Therefore, alternative techniques for determining MAF into the ICE have developed. Two conventional techniques include a speed density technique and a throttle position technique. The speed density technique determines MAF based on MAP, engine speed and intake air temperature. The throttle position technique determines MAF based on throttle position and engine speed.

Although the conventional techniques eliminate the need for a MAF sensor, they are less accurate than desired. These inaccuracies result from an incorrect estimation of MAF during throttle transient conditions. During throttle transient conditions, a finite amount of time is required to calculate MAF and adjust fuel input. MAF can change dramatically due to the dynamic nature of the ICE during this time. Even during static conditions, the conventional techniques result in cycle-to-cycle measurement variations. More specifically, air flow pulsations that occur as the ICE draws air into the cylinders and delays in processing sensor information result in such cycle-to-cycle variations.

SUMMARY OF THE INVENTION

Accordingly, the present invention provides a control system that determines a mass air flow through a throttle of an internal combustion engine (ICE) having an intake manifold. The control system includes a calculator that calculates an estimated mass air flow based on a throttle position and an adaptation module that determines an adjustment value. The adjustment value is based on the estimated mass air flow, an estimated manifold absolute pressure and a measured manifold absolute pressure. A multiplier multiplies the estimated mass air flow by the adjustment value to determine the mass air flow.

In one feature, the control system further includes a calculator that calculates the estimated manifold absolute pressure.

In another feature, the control system further includes an engine speed sensor that generates an engine speed signal and an intake manifold temperature sensor that generates an intake manifold temperature signal. The estimated manifold absolute pressure is based on the engine speed signal and the intake manifold temperature signal.

In another feature, the control system further includes a multiplier that calculates an adjustment input as a product of the estimated mass air flow and a manifold absolute pressure error. The manifold absolute pressure error is determined as a difference between the estimated manifold absolute pressure and the measured manifold absolute pressure.

In still another feature, the adaptation module is an integrator that integrates an adjustment input that is based on the estimated mass air flow and a manifold absolute pressure error. The adaptation module integrates the adjustment input and multiplies the adjustment input by a gain.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
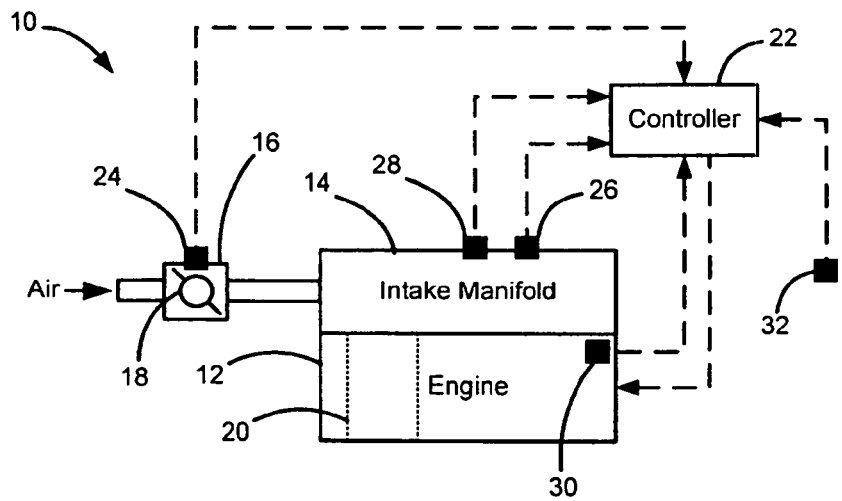
FIG. 1 is a schematic illustration of an internal, combustion engine (ICE) system according to the present invention.

The following description of the preferred embodiments is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, a vehicle 10 includes an internal combustion engine 12 having an intake manifold 14. A throttle 16 regulates air flow into the intake manifold 14. More particularly, a throttle blade 18 is articulated based on a driver input (not shown) to regulate air flow through the throttle 16. The intake manifold 14 directs air flow into cylinders 20 of the engine 12. Although a single cylinder 20 is shown, it can be appreciated that the engine 12 can include multiple cylinders (e.g., 2, 3, 4, 5, 6, 8, 10 and 12). Air flowing into the cylinders 20 is mixed with fuel and the mixture is combusted therein to drive pistons (not shown) producing drive torque.

A control system regulates operation of the engine based on the sensorless control of the present invention. More specifically, a controller 22 monitors and regulates engine operation based on processing several inputs according to the sensorless control. The controller 22 generally includes software-based processing.

A throttle position sensor 24 generates a throttle position signal ($THR_{POS}$) and a manifold absolute pressure (MAP) sensor 26 generates a MAP signal ($MAP_{MEAS}$), which are received by the controller 22. An intake manifold temperature sensor 28 generates an intake manifold temperature signal ($T_{MAN}$) and an engine speed sensor 30 generates an engine speed signal (RPM), which are received by the controller 22. An ambient pressure sensor 32 generates an ambient pressure signal ($P_{AMB}$) that is received by the controller 22. The controller 22 processes the various signals according to the sensorless control and generates at least one command signal based thereon. Engine operation is controlled based on the at least one command signal.

Figure 2:
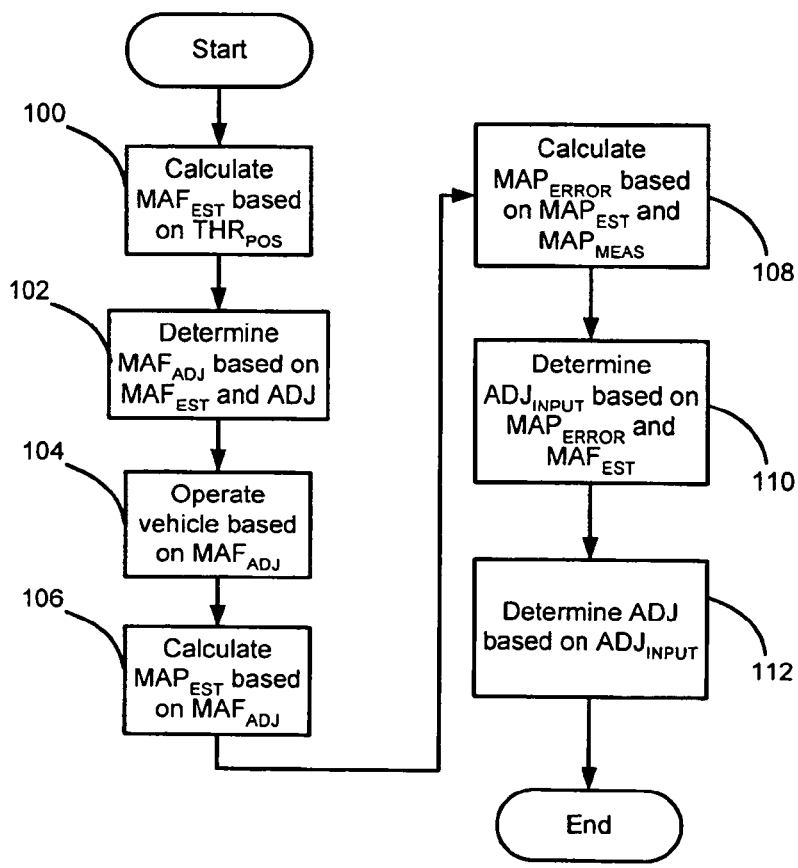
FIG. 2 is a flowchart illustrating mass air flow estimation according to the present invention.

Referring now to FIG. 2, the sensorless control of the present invention will be described in detail. In step 100, control calculates an estimated mass air flow ($MAF_{EST}$) based on $THR_{POS}$. More particularly, a throttle area ($A_{THROTTLE}$) is determined based on $THR_{POS}$. $A_{THROTTLE}$ can be determined from a look-up table based on $THR_{POS}$ or can be calculated by processing $THR_{POS}$ through a mathematical model of the throttle 16. $MAF_{EST}$ is calculated based on the following equation:

$$MAF_{EST} = P_{AMB} \cdot \frac{A_{THROTTLE}}{\sqrt{T_{MAN}}} \cdot \left[ 71.821 \cdot \sqrt{\left(\frac{MAP_{MEAS}}{P_{AMB}}\right)^{1.7074} - \left(\frac{MAP_{MEAS}}{P_{AMB}}\right)^{1.7083}} \right]$$

Control determines an adjusted mass air flow ($MAF_{ADJ}$) based on $MAF_{EST}$ and an adjustment factor (ADJ) in step 102. In step 104, control operates the vehicle based on $MAF_{ADJ}$. More particularly, control can manipulate engine operation parameters based on $MAF_{ADJ}$ to produce desired drive torque or emissions.

Control calculates an estimated manifold absolute pressure ($MAP_{EST}$) based on $MAF_{ADJ}$ in step 106. $MAF_{ADJ}$ is input into a model of intake manifold filling dynamics to calculate $MAP_{EST}$. The following is an exemplary equation for the intake manifold filling dynamics:

$$MAP(k+1) = \left(1 - V_{EFF}\left(\frac{V_{CYL}}{V_{MAN}}\right)\right)MAP(k) + \left(\frac{120 \cdot R \cdot T_{MAN}}{V_{MAN} \cdot RPM \cdot N_{CYL}}\right)MAF_{ADJ}$$

where:
k=current time step;
k+1=future time step;
MAP(k)=$MAP_{EST}$ (i.e., MAP at current time step);
MAP(k+1)=$MAP_{EST}$ (i.e., MAP at future time step);
$V_{EFF}$=volumetric efficiency;
$V_{CYL}$=single cylinder volume
$V_{MAN}$=intake manifold volume;
R=gas constant; and
$N_{CYL}$=number of cylinders.

$V_{EFF}$ is a non-linear function that is based on MAP and RPM. Although $V_{EFF}$ is preferably determined from a look-up table stored in memory, it is anticipated that $V_{EFF}$ can be calculated by the controller 22.

In step 108, control calculates a manifold absolute pressure error ($MAP_{ERROR}$) based on $MAP_{EST}$ and $MAP_{MEAS}$. More particularly, $MAP_{ERROR}$ is the difference between $MAP_{EST}$ and $MAP_{MEAS}$. Therefore, when $MAP_{ERROR}$ is zero, $MAP_{EST}$ and $MAP_{MEAS}$ are equivalent. Control determines an adjustment input ($ADJ_{INPUT}$) based on $MAP_{ERROR}$ and $MAF_{EST}$ in step 110. $ADJ_{INPUT}$ is determined as the product of $MAP_{ERROR}$ and $MAF_{EST}$. In step 112, control determines ADJ based on $ADJ_{INPUT}$. ADJ is preferably determined based on integrating (i.e., summing) $ADJ_{INPUT}$ over time and multiplying by a gain. Because the sensorless control is based on a first order system, the gain can be any value without affecting stability. ADJ can be zero, positive or negative. Generally, ADJ will float around zero in the positive and negative regions. If positive, ADJ pushes the manifold filling model higher until $MAP_{ERROR}$ is zero. If negative, ADJ pushes the manifold filling model lower until $MAP_{ERROR}$ is zero.

Figure 3:
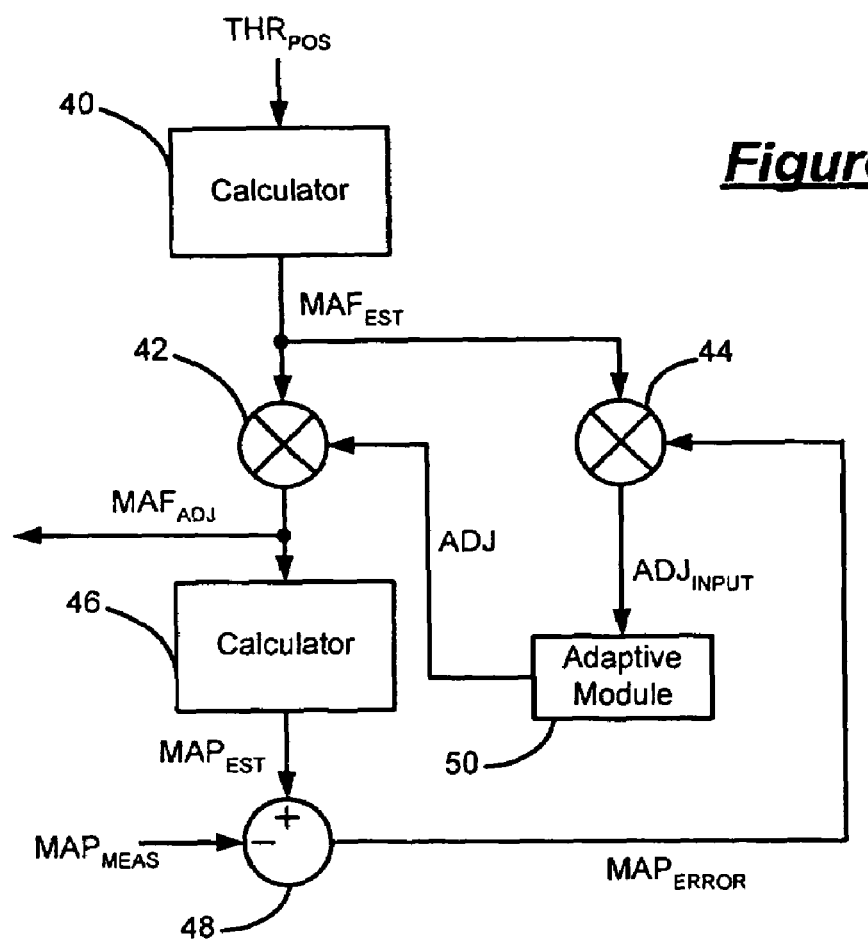
FIG. 3 is a flowchart illustrating steps of the mass air flow estimation.

Referring now to FIG. 3, the sensorless control is shown in further detail. A calculator 40 calculates $MAF_{EST}$ based on $THR_{POS}$, as described above. $MAF_{EST}$ is output to a first multiplier 42 and a second multiplier 44. The first multiplier 42 multiplies $MAF_{EST}$ by ADJ to provide $MAF_{ADJ}$. $MAF_{ADJ}$ is output to a controller, such as the controller 22, and a calculator 46. The controller determines at least one command signal based on $MAF_{ADJ}$ to operate the vehicle.

The calculator 46 calculates $MAP_{EST}$ based on $MAF_{ADJ}$, as described above. $MAP_{EST}$ is output to a summer 48 that determines $MAP_{ERROR}$ based on the difference between $MAP_{EST}$ and $MAP_{MEAS}$. $MAP_{ERROR}$ is output to the second multiplier 44. The second multiplier 44 multiplies $MAF_{EST}$ and $MAP_{ERROR}$ to provide $ADJ_{INPUT}$. $ADJ_{INPUT}$ is output to an adaptation module 50, which can be provided as an integrator. The adaptation module 50 integrates $ADJ_{INPUT}$ to provide ADJ, which is output to the first multiplier 42.

By implementing the sensorless control of the present invention, a MAF sensor can be eliminated. As a result, component count and therefore, component cost and manufacturing costs can be reduced. The sensorless control of the present invention also provides a more robust control system in that $MAF_{ADJ}$ is accurate even if the TPS is not functioning properly. This is because the sensorless control is based on the MAP signal.

It is anticipated, however, that the sensorless control of the present invention can be implemented in parallel with a MAF sensor (not shown). More particularly, the sensorless control enhances reliability when implemented in parallel with a MAF sensor. For example, $MAF_{ADJ}$ can be compared to the MAF sensor signal to ensure that the MAF sensor signal is rational and that the MAF sensor is functioning properly. Also, the sensorless control can be implemented as a back-up MAF input and vehicle control can be seamless in the event that the MAF sensor becomes inoperative.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system that determines a mass air flow through a throttle of an internal combustion engine (ICE) having an intake manifold, comprising:
    a calculator that calculates an estimated mass air flow based on a throttle position;
    an adjustment module that determines an adjustment value based on said estimated mass air flow, an estimated manifold absolute pressure and a measured manifold absolute pressure; and
    a multiplier that multiplies said estimated mass air flow by said adjustment value to determine said mass air flow.

2. The control system of claim 1 further comprising a calculator that calculates said estimated manifold absolute pressure.

3. The control system of claim 1 further comprising:
an engine speed sensor that generates an engine speed signal; and
an intake manifold temperature sensor that generates an intake manifold temperature signal, wherein said estimated manifold absolute pressure is based on said engine speed signal and said intake manifold temperature signal.

4. The control system of claim 1 further comprising a multiplier that calculates an adjustment input as a product of said estimated mass air flow and a manifold absolute pressure error.

5. The control system of claim 4 wherein said manifold absolute pressure error is determined as a difference between said estimated manifold absolute pressure and said measured manifold absolute pressure.

6. The control system of claim 1 wherein said adaptation module is an integrator that integrates an adjustment input that is based on said estimated mass air flow and a manifold absolute pressure error.

7. The control system of claim 6 wherein said adaptation module integrates said adjustment input and multiplies said adjustment input by a gain.

8. A vehicle having a throttle that regulates a mass air flow into an intake manifold of an engine, comprising:
a throttle position sensor that monitors a position of said throttle and that generates a throttle position signal; and
a controller that calculates an estimated mass air flow based on said throttle position signal, that calculates said mass air flow based on said estimated mass air flow and an adjustment value, wherein said adjustment value is based on a manifold absolute pressure error and said estimated mass air flow, and operates said vehicle based on said mass air flow.

9. The vehicle of claim 8 wherein said controller calculates said mass air flow based on an estimated manifold absolute pressure.

10. The vehicle of claim 8 wherein said estimated manifold absolute pressure is further based on a previous value of said mass air flow, a volumetric efficiency of said engine, a volume of said intake manifold and a temperature of said intake manifold.

11. The vehicle of claim 8 wherein said controller calculates said manifold absolute pressure error as a difference between said estimated manifold absolute pressure and a measured manifold absolute pressure.

12. The vehicle of claim 11 further comprising a manifold absolute pressure sensor that generates a measured manifold absolute pressure signal.

13. The vehicle of claim 8 wherein said controller calculates a product of said manifold absolute pressure error and said estimated mass air flow and integrates said product over time to determine said adjustment value.

14. The vehicle of claim 13 wherein said controller of multiplies said product by a gain.

15. A method of determining a mass air flow into an intake manifold of an engine, comprising:
calculating an estimated mass air flow based on a throttle area;
determining an adjustment value based on said estimated mass air flow, an estimated manifold absolute pressure and a measured manifold absolute pressure; and
calculating said mass air flow based on said estimated mass air flow and said adjustment value.

16. The method of claim 15 further comprising controlling said engine based on said mass air flow.

17. The method of claim 15 wherein said estimated manifold absolute pressure is based on a previous value of said mass air flow.

18. The method of claim 17 wherein said estimated manifold absolute pressure is further based on a volumetric efficiency of said engine, a volume of said intake manifold and a temperature of said intake manifold.

19. The method of claim 16 wherein said adjustment value is based on a manifold absolute pressure error and said estimated mass air flow.

20. The method of claim 19 further comprising calculating said manifold absolute pressure error as a difference between said estimated manifold absolute pressure and a measured manifold absolute pressure.

21. The method of claim 20 further comprising generating a measured manifold absolute pressure signal using a manifold absolute pressure sensor.

22. The method of claim 19 further comprising:
calculating a product of said manifold absolute pressure error and said estimated mass air flow; and
integrating said product overtime to determine said adjustment value.

23. The method of claim 22 further comprising multiplying said product by a gain.

24. The method of claim 15 further comprising determining said throttle area based on a throttle position.

25. The method of claim 15 further comprising comparing said mass air flow to a mass air flow value determined based on a mass air flow signal.

* * * * *